F. C. & T. EHRENBERG.
THREAD WINDING MACHINE.

No. 76,724.    Patented Apr. 14, 1868.

Witnesses:

Inventors:
F. C. Ehrenberg
Th. Ehrenberg
per
Van Santvoord & Hauff
Attys

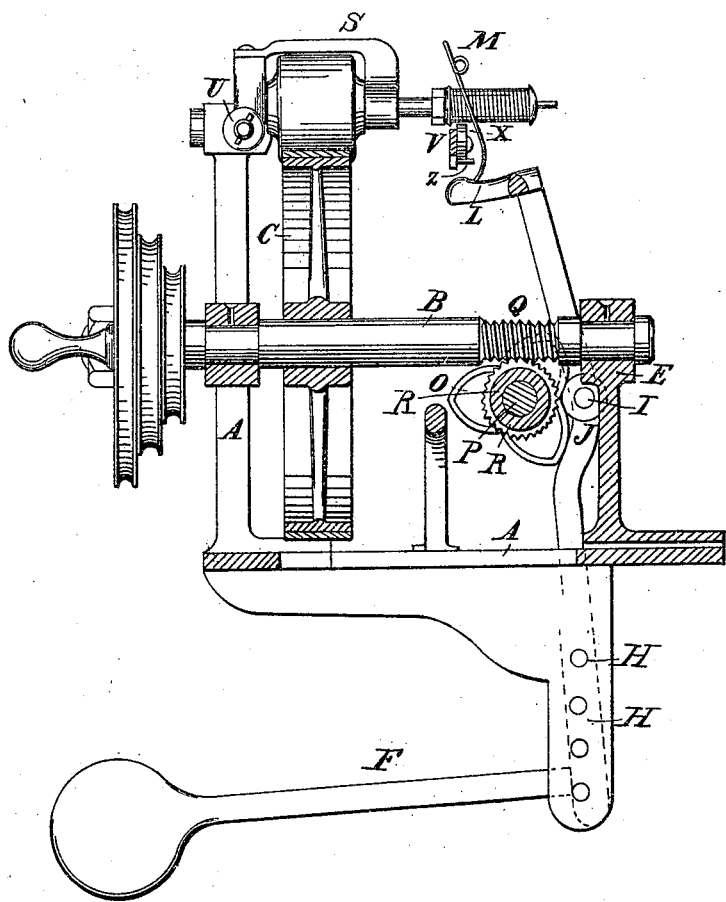

United States Patent Office.

FREDERICK C. EHRENBERG AND THEODOR EHRENBERG, OF NEW YORK, N.Y.

Letters Patent No. 76,724, dated April 14, 1868.

IMPROVEMENT IN THREAD-WINDING MACHINE.

*The Schedule referred to in these Letters Patent and making part of the same.*

TO ALL WHOM IT MAY CONCERN:

Be it known that we, FREDERICK C. EHRENBERG and THEODOR EHRENBERG, of the city of New York, in the county and State of New York, have invented a new and useful Improvement in Machines for Filling Spools; and we do hereby declare the following to be a full, clear, and exact description thereof, enabling those skilled in the art to make and use the same, reference being had to the accompanying drawing, forming part of this specification, in which drawing—

Figure 3 is a vertical section in the plane of the line $x\,x$ in fig. 1.

This invention consists of an improvement in machinery for filling spools or bobbins, especially machinery of the kind shown in Letters Patent of the United States, No. 43,474, dated July 12, 1864, in which is described an automatic arrangement for lifting the spindle of the spool out of contact with the driving-apparatus.

The letter A designates the frame of a spooling-machine, and B a shaft, which carries the driving friction-pulley C, whose periphery is, in this example, covered with leather.

The shaft is supported in bearings formed in standards D E, the standard D being composed of two parts, which are inclined outwards, away from each other, after they rise above the shaft B, their upper parts furnishing the means of supporting the spool-frames of the machinery.

To one side of frame A, I attach the thread-guide F, by a pivot or screw, G, on which the thread-guide vibrates, the position of the pivot or screw being made adjustable by means of holes H, made both in the guide and in the side of the frame, so that the guide can be raised or lowered for adjustment, as required. The lower end of the guide is weighted, so as to swing the upper part of the guide inwards, or towards the spools, and to keep the anti-friction roller I, which is placed on the arm J of the thread-guide, in constant contact with the revolving cam K. The upper part of the guide is provided with inwardly-projecting arms L L, which are so arranged as to move in planes parallel with the spools or bobbins when the thread-guide is vibrated by the cam. The said arms L L are lower than the spools or bobbins, but each has an adjustable vertical finger, M M, through the eyes of which the thread to be wound passes to the spool.

The cam K is made in three heart-shaped divisions, $o\,o\,o$, each of which causes the thread-guide to move outwards and inwards, from and towards the spools.

Said cam is formed on the end of a shaft, P, that is properly supported in frame A, at right angles to the main shaft B, which shaft B has a worm, Q, that engages a pinion, R, on the cam-shaft, by which means the latter receives its motion.

The letter S designates a swinging spool-frame, that is hinged to and swings upon a stud, U, that projects from the top of one of the standards D, in a direction at right angles to the axis of the spool.

Figure 1:
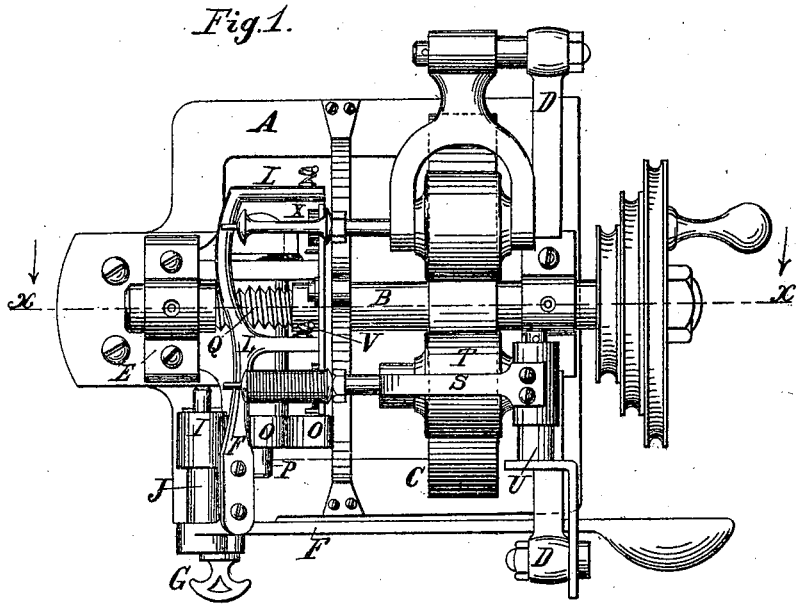
Figure 1 is a plan of a machine that contains our improvement, the part in red outline being intended to show the manner commonly adopted of hinging the spool-frame.

In fig. 1 we have shown, in red outlines, the old method of supporting the spool-frame, so as to be able the better to explain our invention. It will be observed that, according to the old mode, the hinge of the spool-frame is parallel with the axis of the spool, and, consequently, when the spool is raised, as hereinafter described, the force exerted in lifting it is exerted at a disadvantage, because it is not exerted at right angles to the hinge of the spool-frame. Our spool-frame S has a friction-roller, T, that is mounted on the spindle that carries the spool, and that rests on the driving-pulley C; and the said frame is so hinged to the stud U as to bring the plane of the spindle above the hinge, thereby creating a leverage that lessens the force required to lift the spool-frame out of engagement with the driving-apparatus.

Beneath the inner end of the spool is a horizontal bar, V, supported on a standard, W, that rises from frame A, the said bar V being of sufficient length to extend beneath the whole series of spools in the machine. In this example it is of a length sufficient to extend beneath the two spools shown in the drawing.

Figure 2:
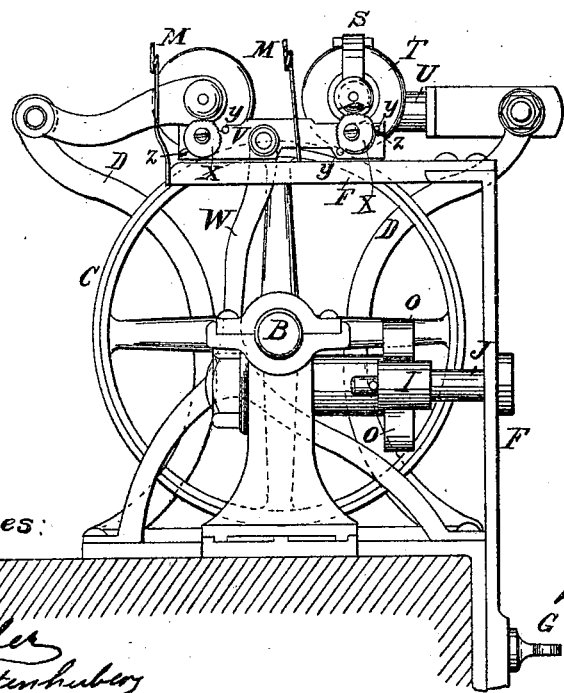
Figure 2 is an elevation looking towards the thread-guide.

To this bar are pivoted rollers X X, one below each bobbin, their pivots being arranged eccentrically, as shown in fig. 2.

The peripheries of said rollers are partly corrugated or roughened, the corrugations commencing on that part of each roller where the diameter is least, and extending over that part where the diameter is greatest.

Owing to the eccentric positions of the pivots on which the rollers turn, the said rollers would, from the force of gravity, revolve on their pivots until the parts which have the greatest diameter, and which, of course, are the heaviest, were below the pivots or centres of motion, and consequently the corrugated parts of their peripheries would be turned to occupy the lowest instead of the highest position, as it is intended they should do.

The object of the corrugations is to enable the bobbin, when it is full, or has reached the proper dimensions, so that it comes in contact with the periphery of that roller which is beneath it, to easily turn the roller by frictional contact, the corrugations preventing the thread on the bobbin from slipping over the roller, the roller continuing its revolution until arrested by a stop, Y, which is placed on the bar V, in the path of a finger, Z, that projects from the smooth part of the periphery of the roller, the parts being so arranged that the roller is arrested after its enlarged side has been brought directly beneath the spool, so as to raise the spool and spool-frame, and lift its roller T out of contact with the driving-pulley C, in which position the parts will remain until the filled bobbin is removed, the weight of the spool-frame preventing the return of the roller X to its former position. The rollers X are prevented from turning too far around by gravity by means of another stop, Y', placed likewise on said bar V, in the same horizontal line with stop Y, but on the opposite side of the rollers respectively. These stops Y Y' form the limits of the vibration or revolution allowed to the said rollers X, the former arresting the rollers when, by the frictional contact of the bobbins or spools, they have been turned so as to bring their enlarged sides uppermost over their centres of motion, and the latter arresting them, to prevent them from turning too far, when, after the removal of the spools, the enlarged heavier sides of the rollers are permitted to yield to the force of gravity.

It will be observed that we accomplish, by this device, the automatic disconnection of the roller of the spool-frame from the driving-pulley whenever the spool has attained such a size as to come in contact with the corrugations or teeth of roller X; and, furthermore, that the spool-frame is so arranged with respect to its hinge, that the spindle is at right angles to the hinge, and the spool-frame is raised with the least possible resistance, which is not the case in the old arrangement, shown in red outlines, where the hinge is parallel with the spindle, and the weight of the spool-frame and its appurtenances serves to bind the hinge and prevent it from turning easily.

Having thus described our invention, what we claim as new, and desire to secure by Letters Patent, is—

1. The eccentric-roller X, with corrugations or teeth on its periphery, in combination with spool-frame S, substantially as described.

2. The eccentric-roller X, and its finger Z, in combination with the stops Y Y', substantially as described.

F. C. EHRENBERG,
THEODOR EHRENBERG.

Witnesses:
  W. HAUFF,
  E. F. KASTENHUBER